US006973245B2

(12) United States Patent
Bocanegra et al.

(10) Patent No.: US 6,973,245 B2
(45) Date of Patent: Dec. 6, 2005

(54) OPTICAL FIBER CABLES

(75) Inventors: Luis M. Bocanegra, Alpharetta, GA (US); Harold P. Debban, Snellville, GA (US); Jennifer R. Meeks, Lawrenceville, GA (US); Kenneth L. Taylor, Lawrenceville, GA (US); Peter A. Weimann, Atlanta, GA (US)

(73) Assignee: Furukawa Electric North America, Norcross, GA (US)

( * ) Notice: Subject to any disclaimer, the term of this patent is extended or adjusted under 35 U.S.C. 154(b) by 14 days.

(21) Appl. No.: 10/749,081

(22) Filed: Dec. 30, 2003

(65) Prior Publication Data

US 2005/0141831 A1 Jun. 30, 2005

(51) Int. Cl.[7] ............................................ G02B 13/648
(52) U.S. Cl. ...................................... 385/102; 106/107
(58) Field of Search ................................ 385/100, 105, 385/106, 109, 112, 110, 102, 107

(56) References Cited

U.S. PATENT DOCUMENTS

| | | | | |
|---|---|---|---|---|
| 6,463,199 | B1 * | 10/2002 | Quinn et al. | 385/109 |
| 2004/0213528 | A1 * | 10/2004 | Bourget | 385/103 |

* cited by examiner

*Primary Examiner*—Chandrika Prasad
(74) *Attorney, Agent, or Firm*—Peter V. D. Wilde

(57) ABSTRACT

The specification describes an improved optical fiber cable wherein the cable cross section is round and contains a plurality of bundled optical fibers. The bundle may comprise randomly spaced fibers or fibers aligned in a ribbon configuration. The bundle is encased in a polymer encasement that couples mechanically to each optical fiber. Preferably, the fibers are spaced from the nearest neighbor to improve coupling. In some embodiments the encasement is relatively hard, and is deliberately made to adhere to the optical fiber bundle. Consequently the encasement medium functions as an effective stress translating medium that deliberately translates stresses on the cable to the optical fibers. The cable construction of the invention is essentially void free, and provides a dry cable with water blocking capability.

13 Claims, 6 Drawing Sheets

OPTICAL FIBER CABLES

RELATED APPLICATIONS

This application claims priority of application Ser. No. 10/420,309, filed Apr. 22, 2003 and application Ser. No. 10/706,585, filed Nov. 12, 2003.

FIELD OF THE INVENTION

This invention relates to optical fiber cables having improved optical transmission characteristics. More particularly, it relates to lightwave transmission cable structures, and methods for their manufacture, in which optical fibers are independently suspended in a coupled encasement to reduce bending losses.

BACKGROUND OF THE INVENTION

High capacity lightwave transmission cables frequently comprise multiple optical fibers organized in a ribbon or bundled fiber configuration. Conventional bundled fiber cables typically have two or more optical fibers randomly organized at the cable core. In an effort to increase the optical fiber density and space efficiency, optical fiber ribbons were designed. In this description, optical fiber ribbons are considered as a species of an optical fiber bundle wherein the fibers are more precisely organized. Optical fiber ribbons are made by arranging two or more optical fibers side-by-side and coating of fusing the optical fibers to bind them together in a single planar array. One or more optical fiber ribbons may then be cabled in a single cable for high capacity optical transmission systems. Where more than one ribbon is used, an efficient arrangement is to stack the optical fiber ribbons, and apply a cable jacket to surround and protect the stack. The stack typically has a rectangular cross section. An advantage of stacked optical fiber ribbon cables is that the individual optical fibers remain organized throughout the cable length during the cabling operation, and in use. Thus for relatively small optical fiber count cables the input and output ends of a given optical fiber are easily matched. (For large count cables color-coded coatings on the ribbons or the fibers typically identify the fiber ends.) Another important advantage of stacked ribbon cables is space efficiency. The cable volume required per optical fiber in a stacked ribbon configuration is typically less than that for a given fiber in a fiber bundle. However, optical fiber bundles wherein the optical fibers are randomly organized are still widely used, especially for relatively small fiber counts.

It has long been recognized that bending of optical fibers is a principal signal loss mechanism. The smaller the bend radius (microbend) the more light escapes from the core of the fiber and is lost. When multiple fibers are arrayed in a cable, the microbending problem is influenced by the nature of the array, since bundles of fibers mechanically interact with one another, as well as with the cable sleeve. The use of optical fibers arrayed in unitary ribbons controls that interaction to some degree, but optical fiber ribbons have their own unique microbending behavior. (Unitary ribbons are defined as those in which the optical fibers are fused together or attached together with a ribbon coating. In an optical fiber unitary ribbon with a rectangular cross section, the out-of-plane bending stiffness is significantly lower than the in-plane bending stiffness, giving rise to the so-called preferred bending axis. Among other consequences, this preferential bending characteristic can cause non-random stresses on certain fibers in the ribbon during cable loading. These stresses may degrade the signal transmission characteristics of the optical fibers in the cable. Thus optical fiber ribbons present special considerations in cabling.

It is also universally recognized in optical fiber cable design that a preferred approach to controlling microbending losses is to mechanically decouple the optical fibers from the surrounding cable. In this way mechanical impacts and stresses on the cable are not translated, or minimally translated, to the optical fibers. Various techniques have been used to achieve this. Early approaches involved placing the optical fiber or optical fiber bundle loosely in a relatively rigid tube. The object was to allow the fibers to "float" in the tube. In alternative designs, the optical fibers are coated with a primary coating, typically a polymer coating, and a cable sheath applied over the coating, also typically a polymer. The primary coating in this case is made soft, so that stresses experienced by the cable are inefficiently translated to the optical fibers within the cable. In yet another design aimed at the same goal, the optical fibers are coated with a gel to reduce mechanical coupling between the optical fibers and the surrounding cable sheath. See U.S. Pat. No. 6,035,087, issued Mar. 7, 2000.

The term "encasement" as used herein is defined as the primary medium that surrounds the optical fibers.

Optical fiber cabling techniques that have a design goal of decoupling of optical fibers have met with only moderate success. This is partly due to the tendency of the bundled fibers within the cable to buckle or wrinkle when the cable is moderately bent. The wrinkles typically form on the inside radius of the bend. Whereas the bend itself may have a relatively large radius, a radius that is above the range where serious microbending losses would occur, the bends of the wrinkles are much smaller, and easily translate to the optical fibers causing microbending loss. Thus a technique for eliminating or minimizing these wrinkles in bundled optical fiber cables would represent an important advance in the technology.

A particularly thorough discussion of coatings or encasements for optical fiber ribbon cables appears in U.S. Pat. No. 6,317,542 issued Nov. 13, 2001. This patent describes a variety of embodiments wherein conformal encasements are used for optical fiber ribbon stacks, and this patent is incorporated by reference herein.

STATEMENT OF THE INVENTION

We have discovered that, contrary to conventional practice, increasing the coupling between optical fiber bundles and the surrounding cable provides unexpected benefits, and reduces the tendency of optical fiber cables to buckle and wrinkle. Increased coupling and reduced microbending loss is achieved by a combination of three features. First, a relatively high modulus encasement is used. Second, adhesion between the optical fibers and the encasement is promoted. The combination of a relatively stiff medium surrounding the optical fiber bundle and relatively high adhesion between the optical fiber bundle and the surrounding medium is important to allow stresses on the cable exterior to be translated to the optical fibers. Translating the stresses to the optical fibers allows the glass fibers in the optical fiber bundle to be used as compression strength members. Inhibiting compressive strain on the optical fibers reduces the tendency of the cable to form wrinkles on the interior of the bend radius.

A further advantage of a tightly coupled cable design is that it is inherently water blocking. This property is most effective when each fiber is surrounded (in cross section) with encasement material, i.e. no voids exist between fibers. This result can be obtained by having a deliberate space between the fibers as the encasement is applied, and maintaining separation between fibers in the final product.

The spaced optical fibers may be arranged in a random configuration, or organized at the corners of a regular quadrilateral. In a pseudo-ribbon cable, with fibers organized "in-line", the separation between fibers allows the individual fibers to independently react to stresses, thus reducing the preferred bending axis effect.

DETAILED DESCRIPTION

Figure 1:
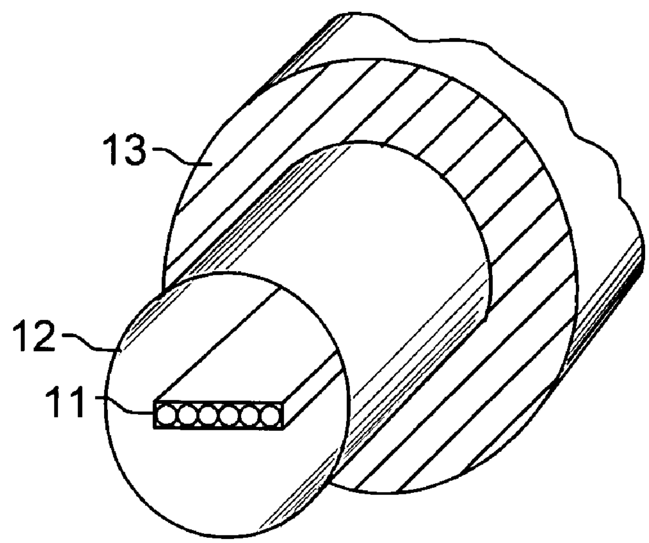
FIG. 1 is a perspective view of a loose ribbon approach to cabling optical fiber ribbons to minimize coupling between the ribbon and the overall cable structure.

Referring to FIG. 1, an optical fiber ribbon 11 is shown encased in a cable sheath. The cable sheath comprises tube 12 and tube coating 13. In this illustration, the optical fiber ribbon has six fibers. Ribbons with four or eight fibers and more, are common and commercially available. It will be understood that these numbers are arbitrary for the purpose of illustration. For more details on the structure of optical fiber ribbons see U.S. Pat. No. 4,900,126, which is incorporated by reference herein. In the embodiment of FIG. 1, the optical fiber stack 11 is essentially completely decoupled from the sheath tube 12. This is a so-called "loose tube" assembly, which is designed to allow the optical fiber stack to "float" inside the tube. When small bends or dents occur in the tube they are minimally translated to the optical fibers.

Figure 2:
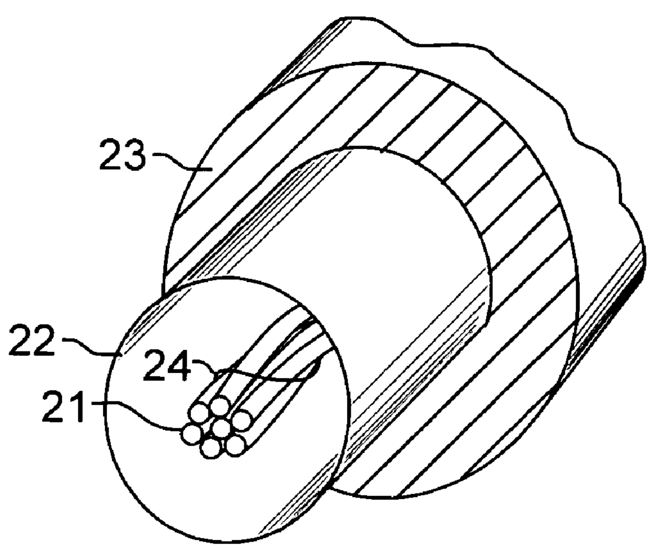
FIG. 2 is a perspective view of a loose fiber approach to cabling optical fibers in randomly arrayed bundles.

An alternative optical fiber bundle cable design is shown in FIG. 2. The optical fiber bundle is shown at 21, the tube at 22 and tube coating at 23. The optical fibers may be wrapped with a yarn 24. Stresses on the outside surface of the cable are decoupled from the optical fiber bundle due to the loose tube arrangement.

Figure 3:
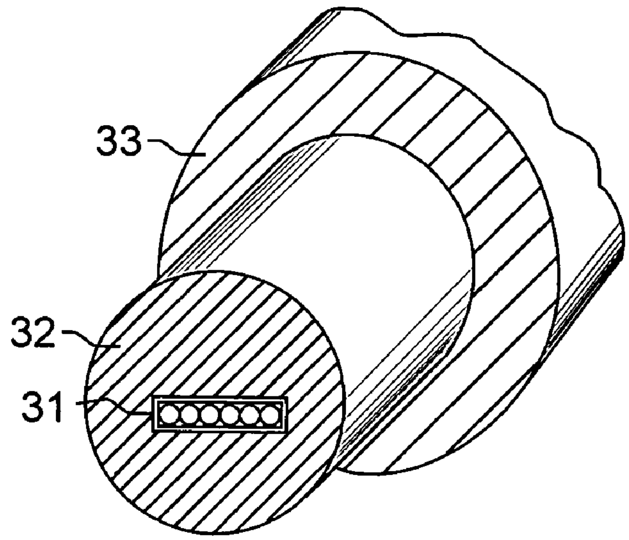
FIG. 3 is a perspective view similar to FIG. 1 illustrating a second approach to cabling optical fiber ribbons to minimize coupling between the ribbon and the overall cable structure.
Figure 4:
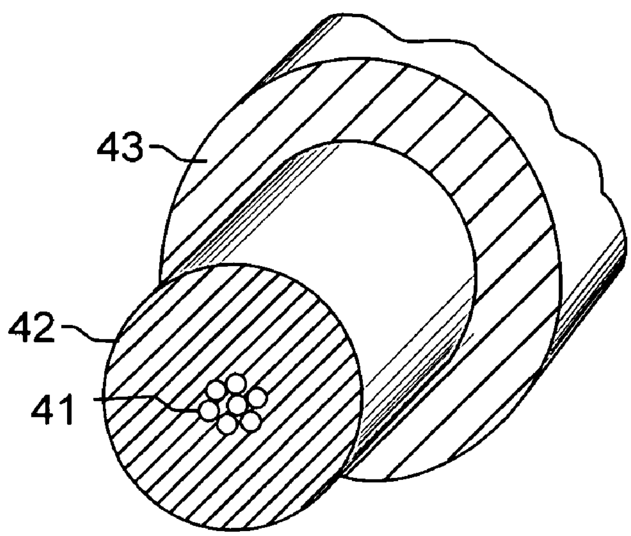
FIG. 4 is a perspective view similar to FIG. 2 illustrating a second approach to cabling optical fiber bundles to minimize coupling between the fibers and the overall cable structure.

FIGS. 3 and 4 show both a ribbon bundle embodiment and a random fiber bundle embodiment in which alternative means are used for decoupling the optical fiber bundle from the exterior surface of the cable. In FIG. 3, the optical fiber ribbon bundle 31 is shown encased in an encasement layer 32, and an outside protective layer 33. FIG. 4 shows a random organized fiber bundle with encasement 42 and protective layer 43. In typical prior art arrangements, the decoupling is achieved by one or both of two mechanisms. One, the inner encasement layer is made of a relatively soft material. Intuitively, it can be appreciated that if the material surrounding the optical fibers is soft, it is an inefficient force-translating medium. This may be viewed as an extension of the design theory of FIG. 1, where inner encasement material is non-existent. The second mechanism for reducing force translation between the optical fiber bundle and the encasement is to minimize the adhesion between the optical fibers in the bundle and the inner encasement. If the optical fibers in the bundle are free to slide within the encasement, tensile and compressive forces are less effectively coupled between them.

Figure 5:
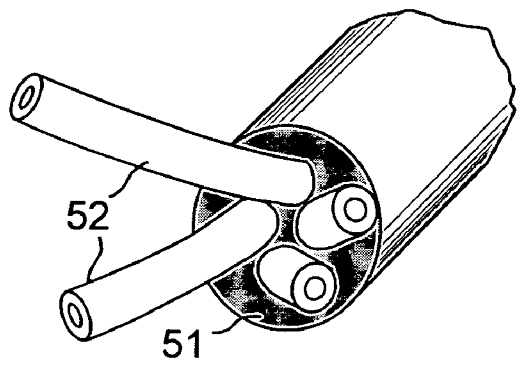
FIG. 5 is a perspective view of a spaced fiber cable design using four fibers with centers on a square.

In the optical fiber bundle cable of the invention the optical fibers are deliberately coupled to the outer surface of the cable. Advantages of this structure are described in detail in U.S. patent application Ser. No. 420,309, filed Aril 22, 2003. The invention as applied to random optical fiber bundles is illustrated in FIG. 5, which shows four optical fibers arranged in a spaced array at the corners of a square. The optical fibers 52 are encased in encasement 51. It will be noted that in the embodiment of FIG. 5, there is only a single coating layer used to form the cable.

The optical fibers 51 comprise a glass core, a glass cladding, and a polymer coating. This is the conventional form of optical fiber. The polymer coating is applied during drawing of the optical fiber and is important for at least two reasons. First, it is universally recognized that coating the surface of the freshly drawn glass fiber is essential for the strength and integrity of the glass fiber. Second, and particularly relevant to this invention, the coating that is applied to the optical fiber as it is drawn is inherently well adhered to the glass fiber. As will become evident, effective stress translation between the outer surface of the optical fiber cable and the glass optical fibers requires firm adhesion at each interface, including the one between the glass optical fiber and the optical fiber coating. The term optical fiber coating as used herein means the primary optical fiber coating that is universally applied to the optical fiber as it is drawn. This coating may have more than one layer and comprise more than one material.

Figure 6:
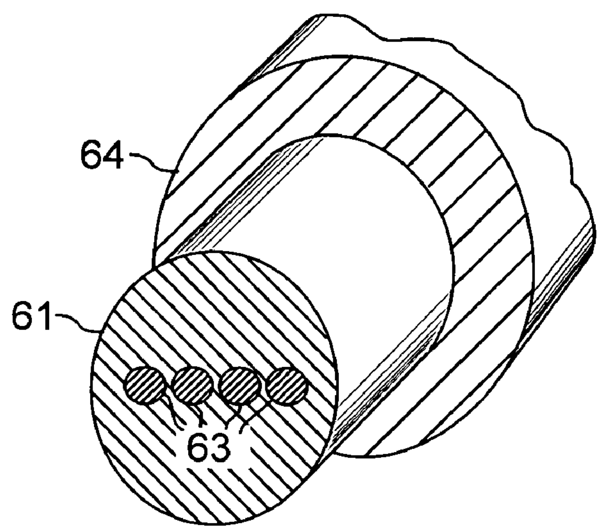
FIG. 6 is a perspective view of a spaced fiber cable design using four fibers in a pseudo-ribbon configuration.
Figure 7:
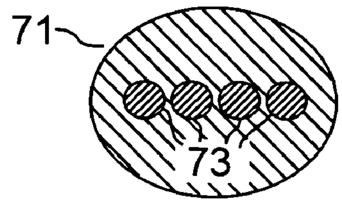
FIG. 7 is a section view of a portion of a spaced fiber cable showing an oval cross section as an alternative to the circular cross section of FIG. 6.

A pseudo-ribbon embodiment is shown in FIG. 6 where optical fibers 63 are encased in encasement 61. In this embodiment an outer encasement layer 64 is shown. This layer is optional. The optical fibers comprise two to eight optical fibers arranged with their centers on a common axis. The embodiment shown is referred to as a pseudo-ribbon because it omits the conventional ribbon coating that is applied to form typical optical fiber ribbons. This is an added economic attribute of the invention. In the embodiment shown in FIG. 6, the cable cross section is circular. A straightforward modification of this is shown in FIG. 7 where optical fibers 73 are encased in an encasement with an oval cross section. By way of definition the term essentially circular when used herein is intended to include this modification.

The optical fibers are deliberately spaced from the nearest neighbors to allow the encasement to fully surround the surface of the optical fiber. This is the case in both the random bundle and the pseudo-ribbon bundle. In each case the encasement has important features that are contrary to the trends in the prior art. First, the material of the encasement is relatively rigid. This allows stresses on the outside of the encasement to be deliberately translated to the optical fibers in the bundle. For this function it is recommended that the material of encasement have an elastic modulus of more than 170 MPa, and preferably more than 210 MPa. Preferred specific materials for the encasement are polyolefins and ester-based polymers such as polyethylene, polypropylene, polyvinylchloride, ethylene-vinyl acetate polymers, ethylene acrylic acid polymers, ester-based polymers, and copolymers of the foregoing. These materials are given by way of example are not limiting of potential suitable materials. In each case the density and other properties of the polymers may be tailored by methods well known in the art to provide the mechanical characteristics of the invention, as well as other desired properties. For example, spaced optical fiber bundle cables that are used inside buildings may require fire-retardant polymers. An example is DGDA-1638-NT, a fire-retardant low-smoke zero-halogen resin available from the Dow Chemical Company. At 23° C., this material has an elastic modulus of approximately 213 MPa. A non-fire retardant preferred material is DFDA-6115, a low-density polyethylene available from Dow Chemical Co. This material has an elastic modulus of approximately 213 MPa at 23° C.

A second feature of the encasement is that it is made to adhere to each of the optical fibers in the bundle. The result follows from the characteristic that each optical fiber is spaced from its nearest neighbors. The combination of moderate adhesion between the optical fibers and the encasement, and a relatively stiff encasement medium, effectively translates stress to the optical fibers in the optical fiber bundle. It is well known that glass fibers have high stiffness, both in tension and compression. In the spaced optical fiber bundle designs of FIGS. 5 and 6, the glass fibers act as compressive strength members, effectively preventing the cable from buckling or otherwise distorting. Long, slender structures such as fibers or ribbons are limited in their ability to act as a compressive stiffness member due to buckling. Once buckled, the effective compressive stiffness of the structure is dramatically lowered, and in some cases, effectively disappears. When compared with the prior art embodiments of FIGS. 1–4, the presence of the encasement medium tends to retard the onset of buckling by increasing the compression strain energy threshold required to trigger the elastic instability. Thus an encasement formed according to the invention enables the fiber ribbon to carry a greater compressive load or strain before buckling. Furthermore, the encasement can act as a tangent stiffness matrix in the buckled state, restricting the magnitude of the lateral deflection of the ribbon and minimizing the extent to which the buckling reduces the effective compressive stiffness. A more specific discussion of these features is given in the application referred to above.

An additional feature of the coupled encasement is that it forms a natural water block. This eliminates the necessity for gel-filling or absorbent tapes.

The preferred method for producing the spaced optical fiber bundle cable of the invention is extrusion. Other techniques, such as application of prepolymers and UV or thermal curing cause the optical fibers to bundle together with substantial surface contact. This results in voids in the encasement. Attempts may be made to form spaced optical fiber bundles cable by these techniques, but when the bundle is passed through a single die, in a conventional prepolymer applicator, there is no adequate means for maintaining reliable spacing between the fibers. In an extrusion apparatus, the die may be designed, using known design methods, to introduce encasement material to the inner recesses of the bundle. This is the result of the pressure that the extrusion apparatus applies to the viscous encasement material as it is applied. The relatively high viscosity of the polymer material allows hydrostatic pressure to be applied across the entire cable cross section, forcing polymer material into the center of the cable. By contrast, the low viscosity characteristic of prepolymer coating materials does not allow sufficient hydrostatic pressure to develop even if a die were designed for this purpose.

For the embodiment shown in FIG. 5, four reels of optical fiber are suitably mounted for feeding the four fibers into the extruder. Spacing may be maintained using, for example, a grooved die at the entrance of the extruder.

Figure 8:
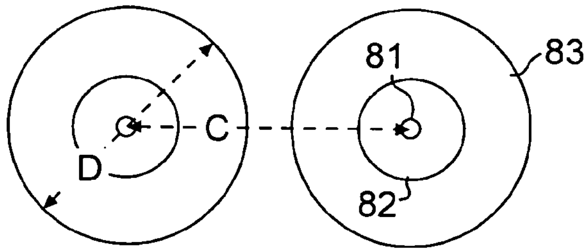
FIG. 8 is a diagram illustrating the dimensions used to determine spacing between nearest neighbor coated fibers in accordance with a principle of the invention.

Proper spacing of the optical fibers is important to gain the advantages described. FIG. 8 shows the relevant nearest neighbor spacing C, as measured from center-to-center. As described earlier, the optical fibers comprise a core 82, a cladding 82, and a polymer coating 83. Typical dimensions for these elements in terms of overall diameter are core—5–15 microns, cladding (including core) 125 microns, and coating (overall optical fiber diameter D) 250 microns. The spacing C should be large enough to allow access of the encasement material to the inner region of the cable during extrusion of the encasement. However, if the spacing is very large, the cable diameter may be excessive, and encasement material is wasted. The recommended range of spacing between the outer surfaces of nearest neighbor fibers is 20–250 microns, preferably 20–150 microns.

Figure 9:
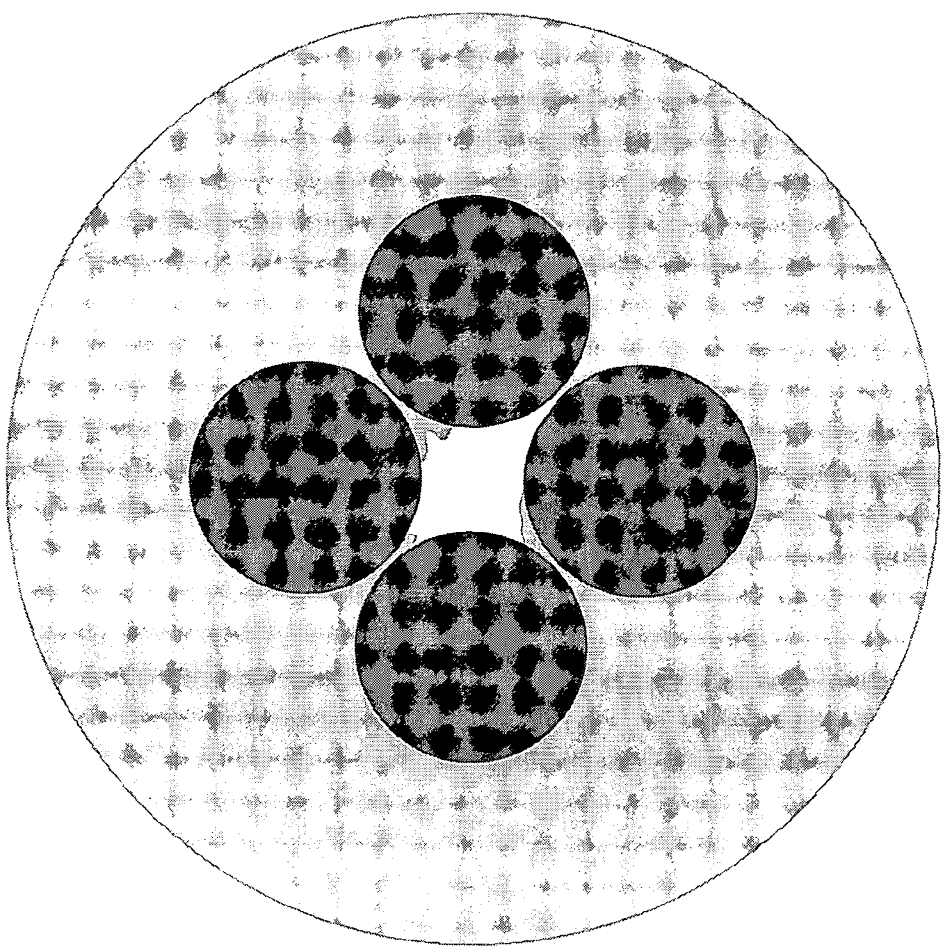
FIG. 9 is a schematic view of a spaced fiber cable design using four fibers with centers on a square, but spaced too close to allow proper application of the encasement.

FIG. 9 is a schematic diagram that is approximately to scale (relative dimensions). The four fibers are each 250 microns in diameter, the overall diameter of the cable is 0.8 mm, and the center-to-center spacing between nearest neighbor fibers, C, is 260 microns. This leaves a separation between the outer surfaces of nearest neighbor fibers of 10 microns. As indicated by the schematic drawing, the encasement does not completely fill the space between fibers, leaving a void at the center of the cable. This is unacceptable from both the standpoint of coupling, as discussed earlier, and water blocking, also discussed above.

Figure 10:
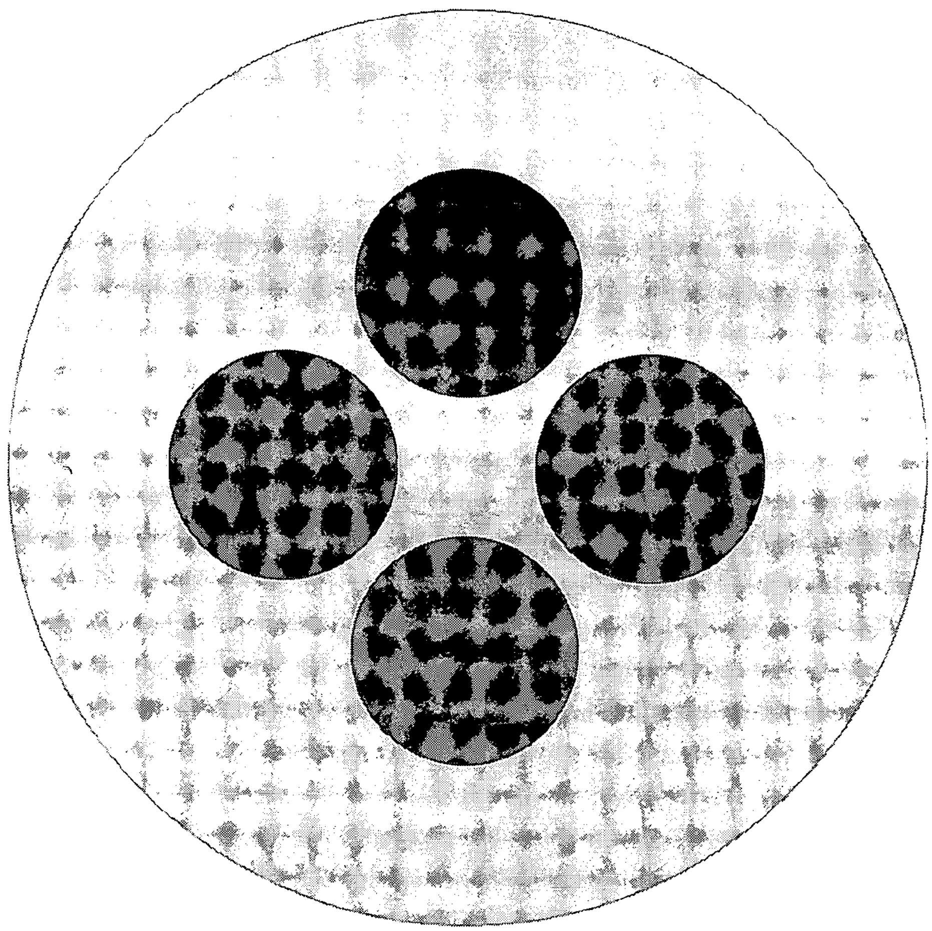
FIG. 10 is a schematic view of a spaced fiber cable design similar to that shown in FIG. 9 but with fibers properly spaced.

FIG. 10 shows schematically a spaced fiber cable similar to that of FIG. 9, also approximately to relative scale, but with spacing C of 280 microns. This spacing, equivalent to a space of 30 microns between the outer surfaces of nearest neighbor fibers, is adequate to allow the encasement material to completely fill the potential void at the center of the cable.

Figure 11:
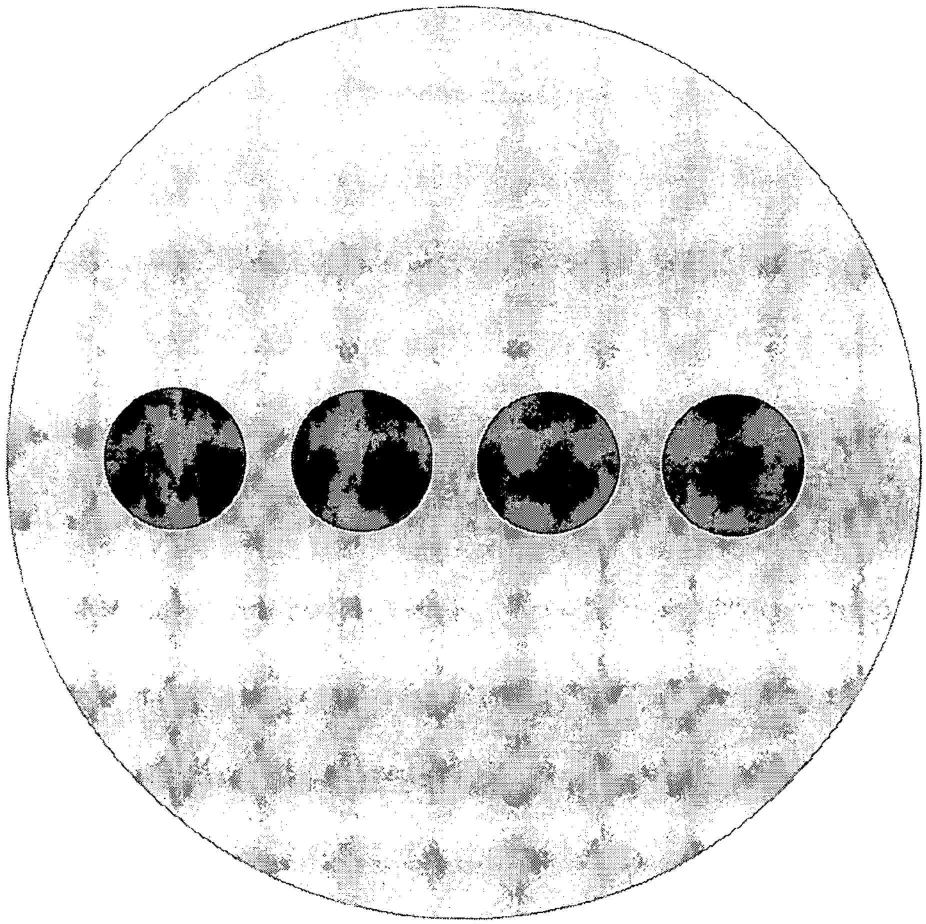
FIG. 11 is a schematic view of a spaced fiber cable design with fibers arranged in a pseudo-ribbon configuration.
Figure 12:
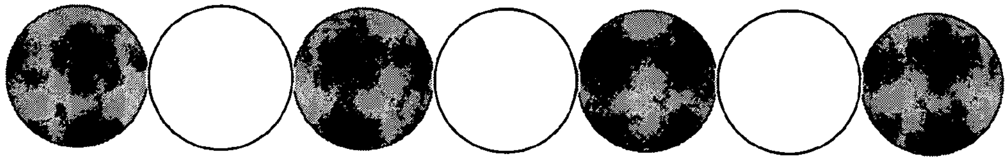
FIG. 12 is a diagram showing an alternative embodiment for spacing fibers in a pseudo-ribbon spaced fiber cable.

FIG. 11 shows a pseudo-ribbon embodiment, to relative scale, with four optical fiber arranged in-line as shown. The ribbon configuration is inherently larger in cross section than a square or polygon centered array (FIG. 5). In this illustration, the optical fibers are 250 microns in diameter, the center-to-center spacing C is approximately 330 microns (80 microns between outer surfaces), and the overall diameter is approximately 1.6 microns. Although the pseudo-ribbon designs are characteristically less space efficient in terms of cable diameter than random bundles, the pseudo-ribbon offers other advantages, such as reliable fiber organization, and compatibility with existing splice technology. For example, some multiple fiber splicers designed for ribbon splicing have v-groove arrangements with the grooves corresponding to the abutting fibers in the ribbon. In that case the v-grooves in the splicer would be spaced at a distance corresponding to the diameter of the optical fibers in the ribbon. The same apparatus can be used conveniently as a multiple splicer with a spaced fiber cable having center-to-center spacing shown in FIG. 11, i.e. 2× the optical fiber diameter. In this case, every other v-groove would be occupied by a fiber.

As shown in FIG. 6, an optional outer polymer coating may be provided for added protection. In such a case, the primary encasement (61 in FIG. 6) may be thinner, serving mainly to fill the potential voids in the optical fiber bundle. It is preferred that the total thickness of polymer material as measured between the outer surface of the outermost optical fiber and the outside surface of the cable be large enough to prevent the fibers from protruding through the encasement. A recommended range for this thickness is 50–500 microns. This thickness may depend on the desired diameter of the overall cable. For example, if the target cable diameter is 1.0 mm, a four fiber pseudo-ribbon design would have a thinner outer coating than, for example, a two fiber design.

The outer encasement layer(s) (64 in FIG. 6) will typically be a polymer with properties tailored to the intended application for the cable. The outer layer may be flame retardant, for customer premises applications. It may be specially designed for air blown installations. See U.S. patent application Ser. No. 10/233,719, filed Sep. 3, 2002, incorporated by reference herein. The outer layer 64 preferably has a modulus of 210–2000 MPa. Other details of appropriate outer layer materials may be found in U.S. Pat. No. 6,317,542.

When added cable strength is desired, a layer of fiberglass or aramid yarn may be provided between the encasement and an outer layer. This provides added tensile strength for cable pulling operations.

The cross section of the encasements in all of the embodiments of the invention is specifically and deliberately round. This configuration is preferred for ease in manufacture, ease in installation, and for other important reasons.

The amount of adhesion desired between the optical fibers in the bundle and the surrounding encasement may vary substantially depending on the system design. If adhesion is too low, stress on the encasement layer will not be effectively translated to the optical fiber ribbon stack. Normally adhesion in the desired range will occur as the result of the intrinsic material characteristics, i.e. the polymer-to-polymer intrinsic adhesion, and the method used for applying the encasement. The adhesion desired is easily obtained using known extrusion manufacturing methods.

The term "encasement" is used herein to describe the primary medium that surrounds each optical fiber. As indicated earlier, there may or may not be an additional coating or cable sheath in the optical fiber cable product of the invention.

However, even though the fibers are nominally separated, in practice there may be some unavoidable contact between portions of the fibers. So while separation is the design goal, some contact between fibers may be experienced. The objective is to minimize voids in the cable that extend longitudinally along the cable length. This may be achieved effectively even though fibers occasionally touch. Thus although a specific spacing may be specified some small deviation from that spacing may be assumed. Nominal center-to-center spacing is intended as meaning that nearest neighbor fibers can touch incidentally along the cable length, but that over most of the length, e.g. 90% of the length, nearest neighbor fibers do not touch.

In some embodiments of the invention, it may be desirable to add a rip cord to assist in stripping the encasement for splicing.

As is well known in the art each of the optical fibers is provided with an optical fiber coating. For simplicity, the optical fiber coating is not shown in some of the figures. It should be understood that the encasement contacts the optical fiber coating, i.e. there is no additional coating in between. In particular, this is the case with the pseudo-ribbon embodiments of the invention, and offers an advantage over conventional ribbon structures that have an additional coating used to form the ribbon.

Various additional modifications of this invention will occur to those skilled in the art. All deviations from the specific teachings of this specification that basically rely on the principles and their equivalents through which the art has been advanced are properly considered within the scope of the invention as described and claimed.

What is claimed is:

1. An optical fiber cable comprising:

(a) an optical fiber bundle comprising a plurality of longitudinally extending optical fibers spaced from one another, (b) a solid polymer encasement having an essentially circular cross section and encasing each of the plurality of optical fibers, the solid polymer encasement having an elastic modulus greater than 210 MPa at 23° C. so that stresses on the encasement are effectively translated to the optical fiber bundle.

2. The optical fiber cable of claim 1 wherein the optical fibers each have centers and the center-to-center spacing of nearest neighbor optical fibers is at least D+20 microns, where D is the diameter of the optical fibers.

3. The optical fiber cable of claim 1 wherein the optical fibers each have centers and the center-to-center spacing of nearest neighbor optical fibers is in the range D+20 to D+150 microns, where D is the diameter of the optical fibers.

4. The optical fiber cable of claim 1 wherein the optical fiber bundle comprises optical fibers randomly spaced.

5. The optical fiber cable of claim 4 with 1–8 optical fibers.

6. The optical fiber cable of claim 5 with four optical fibers having centers on the corners of a square.

7. The optical fiber cable of claim 1 wherein the optical fiber bundle comprises at least 3 optical fibers, the optical fibers having centers, with the centers lying on a common axis.

8. The optical fiber cable of claim 1 additionally including an additional polymer layer over the encasement.

9. The optical fiber cable of claim 8 wherein the additional polymer layer has an elastic modulus of at least 210 MPa at 23° C.

10. The optical fiber cable of claim 1 wherein the minimum thickness of the encasement measured from the outside of an optical fiber to the outside of the encasement is in the range 50–500 microns.

11. The optical fiber cable of claim 1 wherein the encasement is low-density polyethylene.

12. The optical fiber cable of claim 1 wherein the encasement is essentially void-free.

13. The optical fiber cable of claim 1 wherein the encasement is oval in cross section.

* * * * *